United States Patent
Bauducco

(10) Patent No.: US 12,455,863 B2
(45) Date of Patent: Oct. 28, 2025

(54) DATA INGESTION AND CLEANSING TOOL

(71) Applicant: Shipt, Inc., Birmingham, AL (US)

(72) Inventor: Diego Bauducco, San Francisco, CA (US)

(73) Assignee: Shipt, Inc., Birmingham, AL (US)

( * ) Notice: Subject to any disclaimer, the term of this patent is extended or adjusted under 35 U.S.C. 154(b) by 64 days.

(21) Appl. No.: 18/155,533

(22) Filed: Jan. 17, 2023

(65) Prior Publication Data

US 2024/0241869 A1    Jul. 18, 2024

(51) Int. Cl.
G06F 16/20 (2019.01)
G06F 16/21 (2019.01)
G06F 16/215 (2019.01)
G06F 16/25 (2019.01)

(52) U.S. Cl.
CPC .......... G06F 16/215 (2019.01); G06F 16/212 (2019.01); G06F 16/254 (2019.01)

(58) Field of Classification Search
None
See application file for complete search history.

(56) References Cited

U.S. PATENT DOCUMENTS

| | | | |
|---|---|---|---|
| 8,224,830 B2 | 7/2012 | Bidlack | |
| 9,418,085 B1 | 8/2016 | Shih et al. | |
| 9,514,205 B1* | 12/2016 | Yazicioglu | G06F 16/258 |
| 9,990,383 B2 | 6/2018 | Brinnand | |
| 10,817,533 B2 | 10/2020 | Kim et al. | |
| 2006/0069717 A1* | 3/2006 | Mamou | G06F 16/254 |
| | | | 709/203 |
| 2016/0267110 A1* | 9/2016 | deValk | G06F 16/211 |
| 2021/0133392 A1* | 5/2021 | Liao | G06F 16/93 |
| 2021/0240676 A1* | 8/2021 | Meyer | G06F 16/2423 |
| 2023/0078600 A1* | 3/2023 | Ji | G06F 16/275 |
| | | | 707/626 |
| 2023/0342690 A1* | 10/2023 | Cruise | G06Q 10/0631 |

OTHER PUBLICATIONS

Jetpack CRM, How to Map CSV Importer fields; Dated: Oct. 12, 2022—11 Pages.
Text Import Wizard; Dated: Oct. 12, 2022—7 Pages.
CSV Lint About—About this service—How to Use CSVLint; Dated: Oct. 12, 2022—12 Pages.
CSV Box—Features—CSV Uploader Built for SaaS—Powerful features to help you integrate a perfect CSV upload experience in your app.; Dated: Oct. 12, 2022—7 Pages.
ConvertCSV—Secure and easy CSV Data Conversion—Dated: 2013-2022—3 Pages.

\* cited by examiner

*Primary Examiner* — Jau Shya Meng
(74) *Attorney, Agent, or Firm* — Merchant & Gould P.C.

(57) ABSTRACT

A system and method for ingesting data is disclosed. In example embodiments, the method may include receiving a structured data file, such as a comma separated value (CSV) file, and translating the file to an internal schema. Translating the file to the internal schema may including mapping one or more incoming fields of the file to one or more internal fields of the internal schema. The method may further include displaying a user interface and receiving, via the user interface, a mapping of an unmapped incoming field to a selected internal field. The method may further include receiving a second structured data file, which may include a second plurality of incoming fields, including the unmapped field. The method may further include mapping the unmapped field of the second file to the selected internal field.

16 Claims, 11 Drawing Sheets

DATA INGESTION AND CLEANSING TOOL

BACKGROUND

Entities often share data between information systems. However, entities may use different formats to store and manage their data. Even if two entities use structured data files, such as comma-separated values (CSV files), the entities may use different schema within such files. For example, one entity may use the field title "ZIP," and another may use "Postal Code," to refer to the same data. Still further, some organizations may maintain a ZIP or Postal Code within an address field alongside a street address and state information, while other organizations may store these in separate fields. As yet another example, one entity may use the metric system while another does not. Because of these discrepancies, entities may expend significant labor and time to transfer data. This problem quickly escalates as the number of entities and amount of data increase. Another challenge is that data may frequently change, thereby requiring recurring exchanges to actualize data. In the retail context, for example, an organization may interface with numerous partner entities, each of which may have different ways of formatting data, and each of which may have vast amounts of data with varied features. In some instances, the costs in the form of time, labor, and money may become so high to share data with an entity that the organization may divert resources from other areas or completely forego interacting with that entity.

Some existing solutions for ingesting data may require significant labor or time. For example, relying on manually inspecting and verifying data may be time consuming and prone to errors. As another example, writing a script to parse a data file may be costly and be of limited utility for future data, for data sent by a different sender, and for different types of data.

SUMMARY

Aspects of the present disclosure relate to a method and system for ingesting data. In some embodiments, the method may include receiving a structured data file, such as a CSV file and translating the structure of that received file to an internal schema. Translating the structured data file from its original schema to the internal schema may include mapping one or more fields of the incoming structured data file to one or more internal fields of the internal schema. The method may further include displaying a user interface for receiving an input that maps an unmapped field of the incoming structured data file to a selected internal field. The method may further include applying the mapping of the unmapped incoming field to the selected internal field for future incoming structured data files.

In a first aspect, a method for ingesting data is disclosed. The method comprises receiving a first CSV file, the first CSV file including a plurality of incoming fields; translating the first CSV file to an internal schema, wherein translating the first CSV file to the internal schema comprises mapping one or more of the plurality of incoming fields to one or more of a plurality of internal fields of the internal schema; displaying a user interface; via the user interface, receiving an input corresponding to a mapping of an unmapped field of the plurality of incoming fields to a selected field of the plurality of internal fields; receiving a second CSV file, the second CSV file including a second plurality of incoming fields, the second plurality of incoming fields including the unmapped field; and translating the second CSV file to the internal schema, wherein translating the second CSV file to the internal schema comprises applying the mapping of the unmapped field to the selected field.

In a second aspect, a system for ingesting data is disclosed. The system includes a mapping library; an internal schema; a processor; and a memory storing instructions, wherein the instructions, when executed by the processor, cause the data-ingestion system to: receive a first CSV file, the first CSV file including a plurality of incoming fields; translate the first CSV file to the internal schema, wherein translating the first CSV file to the internal schema comprises mapping, using the mapping library, one or more of the plurality of incoming fields to one or more of a plurality of internal fields of the internal schema; receive an input corresponding to a mapping of an unmapped field of the plurality of incoming fields to a selected field of the plurality of internal fields; add, to the mapping library, the mapping of the unmapped field of the plurality of incoming fields to the selected field of the plurality of internal fields; receive a second CSV file, the second CSV file including a second plurality of incoming fields, the second plurality of incoming fields including the unmapped field; and translate the second CSV file to the internal schema, wherein translating the second CSV file to the internal schema comprises applying, using the mapping library, the mapping of the unmapped field to the selected field.

In a third aspect, a data cleansing method is disclosed. The method comprises receiving a first CSV file, the first CSV file including a plurality of incoming fields; translating the first CSV file to an internal schema, wherein translating the first CSV file to the internal schema comprises mapping one or more of the plurality of incoming fields to one or more of a plurality of internal fields of the internal schema; displaying a user interface; via the user interface, receiving an input corresponding to a mapping of an unmapped field of the plurality of incoming fields to a selected field of the plurality of internal fields; validating first incoming data of the first CSV file; receiving a second CSV file, the second CSV file including a second plurality of incoming fields, the second plurality of incoming fields including the unmapped field; translating the second CSV file to the internal schema, wherein translating the second CSV file to the internal schema comprises applying the mapping of the unmapped field to the selected field; and validating second incoming data of the second CSV file.

DETAILED DESCRIPTION

Figure 1:
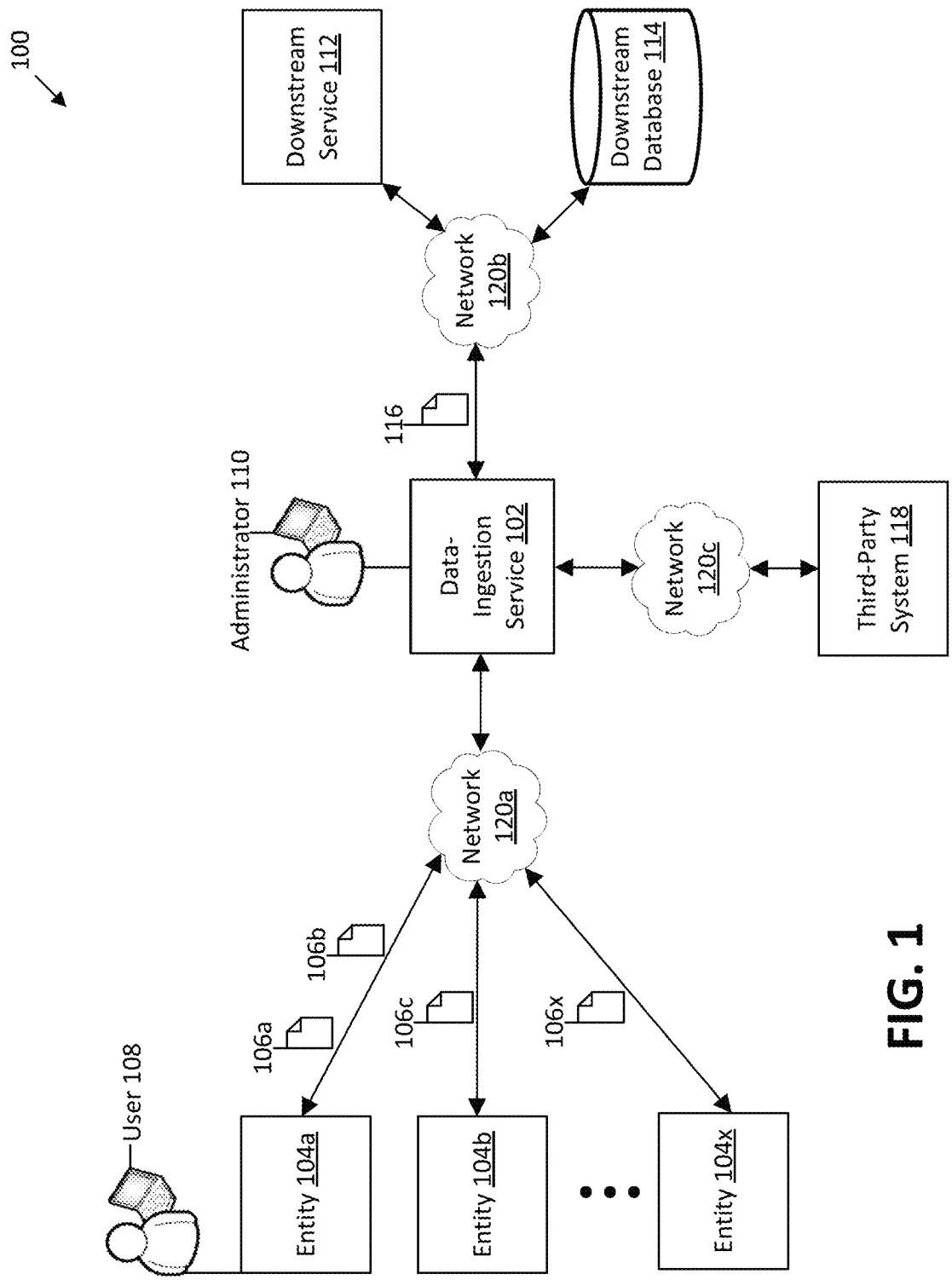
FIG. 1 illustrates a network diagram in which aspects of the present disclosure can be implemented.

As briefly described above, aspects of the present disclosure are directed to a method and system for processing incoming data. Aspects of the present disclosure may be implemented as a data-ingestion service. In some embodiments, the service may receive a structured data file, such as a comma-separated value (CSV) file. The service may translate the incoming structured data file to an internal schema, and validate data of the incoming file. The service may also learn from instances in which data was not automatically ingested, thereby more accurately processing future structured data files having the same, or similar, structures.

In example aspects, the service may display a user interface and receive, via the user interface, an incoming CSV file. The incoming CSV file may include a plurality of fields (e.g., columns) and a plurality of records (e.g., rows). Each record may include a value for one or more of the fields. The service may translate the incoming CSV file to an internal schema, which may include a plurality of internal fields. To translate the incoming CSV file to the internal schema, the service may apply a mapping library. The mapping library may link a field of the incoming CSV file to a field of the internal schema.

In example aspects, if the service fails to map an incoming field to an internal field, the service may flag the failed mapping. The service may, for example, display a user interface, which may include the unmapped field. Using features of the user interface, a user may select one or more internal fields to map the unmapped field to. The service may receive this user input and map the unmapped field accordingly.

In example aspects, the service may take other action to translate the incoming CSV file to the internal schema. For example, if a CSV file has two fields for what is only one internal field, then the service may combine the two fields—including the data in those fields—into one field. Similarly, if the CSV file has one field for what are two or more fields in the internal schema, then the service may separate the one field—and the data in that field—into the two or more internal fields.

In examples aspects, the service may learn how to better ingest CSV files. For example, if the service receives a user input mapping a field to an internal field, then for future incoming CSV files, the service may automatically map that field to the internal field. Similarly, if the service receives an input separating or combining one or more fields to fit the internal schema, then the service may automatically perform such operations for future incoming CSV files. In some examples, the service may develop an entity-specific ingestion process. In some examples, the service may apply a mapping learned translating a CSV file from one sender to a CSV file sent from a different sender.

In example aspects, the service may validate data. For example, the service may validate the format of data of the incoming CSV file. For example, the internal schema may dictate a format (e.g., requiring a certain type, or number, of characters) for data in a field. If the data does not have an expected format, the service may display a user interface for fixing it. Additionally, the service may also validate the content of data. For example, the service may use a third-party service to validate that data is legitimate (e.g., that a given address exists). Furthermore, in some examples, the service may use data found in the CSV file to generate new data (e.g., the service may use an address to infer geographic coordinates or calculate a price per pound based on a price per ounce).

Aspects of the present disclosure provide technical advantages over existing tools. For example, aspects of the present disclosure result in data being ingested more efficiently. In some examples, the service allows an enterprise to automatically and efficiently receive data having varied structure from different entities and clean that data for downstream use. In particular, the user interfaces provided herein present a simpler method by which fields may be defined and standardized in structured data files for import. Furthermore, the service continuously learns from user input and applies new knowledge to future incoming data, a feature that may broaden the applicability of the service, improve accuracy, and reduce the need for manual intervention. Thus, an organization may save time and labor costs, minimize errors when ingesting data, and interface with more partner entities. Additionally, in some embodiments, the service integrates many features into one tool by receiving, translating, and validating data, and by communicating with users, thereby representing an integrated data-ingestion tool.

In some embodiments, by increasing the ease and speed at which an incoming file may be translated to an internal schema, aspects of this disclosure represent an improvement to transferring data across networks and between computer systems, thereby representing an improvement to network or computer technology itself. Specifically, in some embodiments, the ingestion of structured data files may be more efficient, more accurate, and less costly due to aspects of the present disclosure. As a result, computer systems that use data exchanged as structured data files such as CSV files, may likewise, in some embodiments, be more efficient, more accurate, and less costly by using data-ingestion processes disclosed herein.

Although the present disclosure provides examples using the context of a comma separated value file, it is recognized that other types of structured data files might be used as well. For example, the principles of the present disclosure may be applicable to tab-delimited files or other structured flat files, optimized row columnar files, spreadsheet files, or other files that rely on position of values within the file to define the relevance of that value (as compared to fully labeled data in which value positioning may not inform relevance of the value).

FIG. 1 illustrates an example network environment 100 in which aspects of the present disclosure can be implemented. The network environment 100 includes a data-ingestion service 102, entities 104*a*-*x*, incoming structured data files, shown as CSV files 106*a*-*x*, a user 108, an administrator 110, a downstream service 112, a downstream database 114, ingested data 116, a third-party system 118, and networks 120*a*-*c*. In other examples, the network environment 100 may include more or fewer components than those illustrated in the example of FIG. 1.

Figure 2:
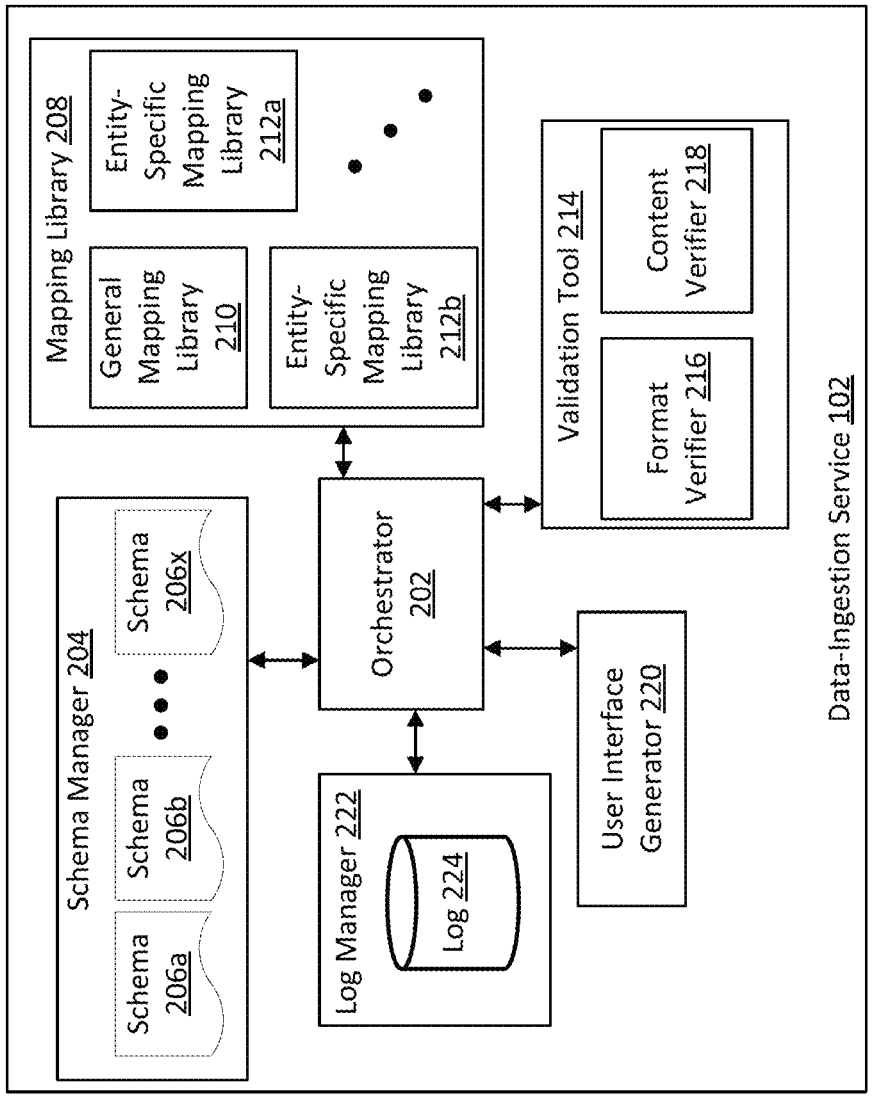
FIG. 2 illustrates a block diagram of aspects of an example architecture of a data-ingestion service.
Figure 3:
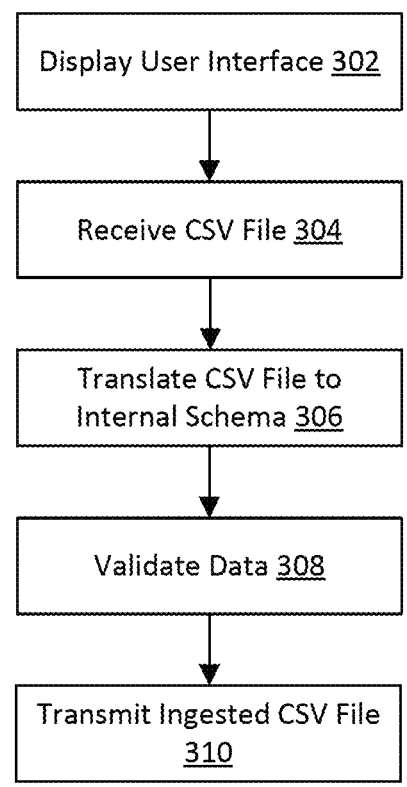
FIG. 3 is a flowchart of an example method useable by a data-ingestion service.
Figure 4:
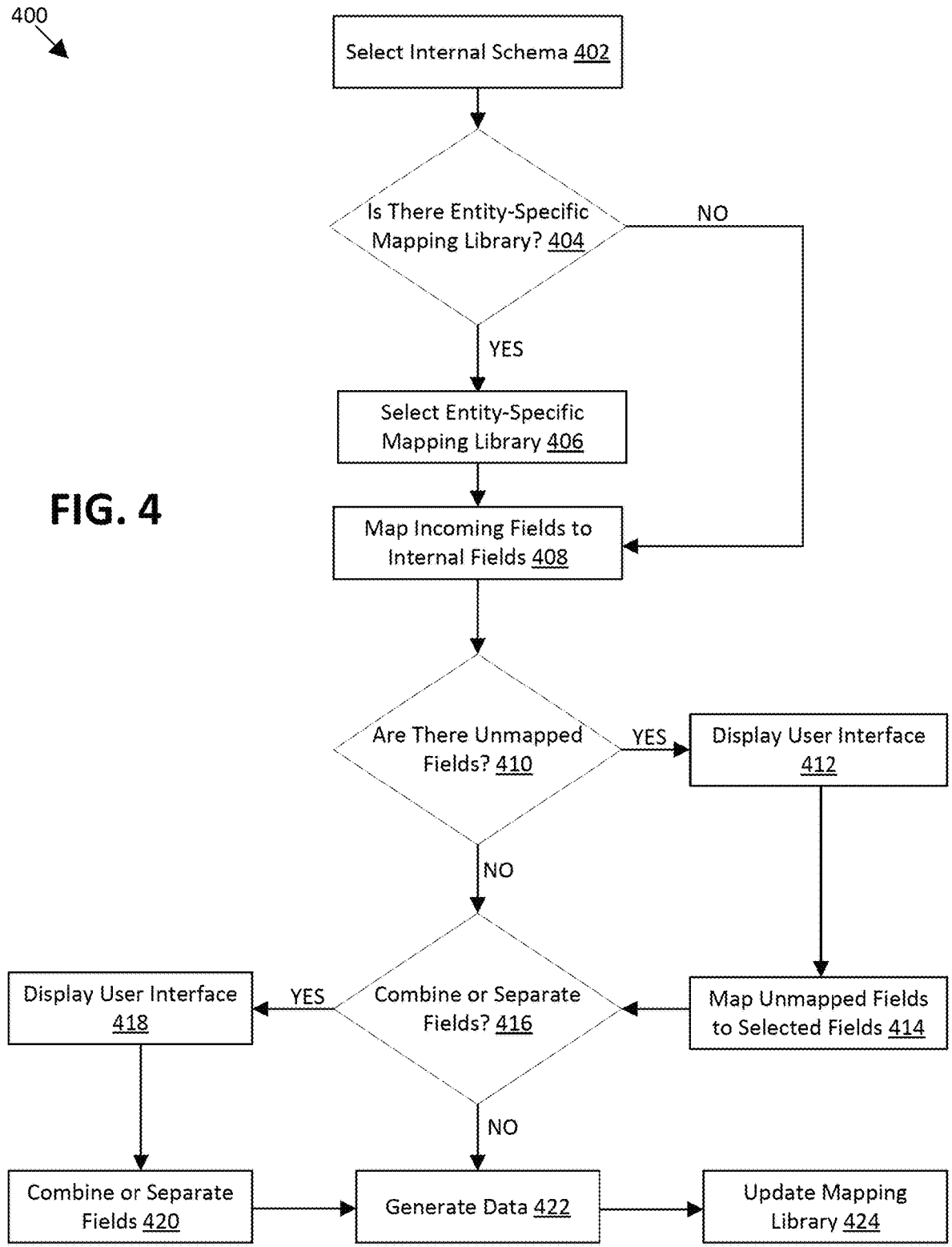
FIG. 4 is a flowchart of an example method for translating a CSV file to an internal schema.
Figure 5:
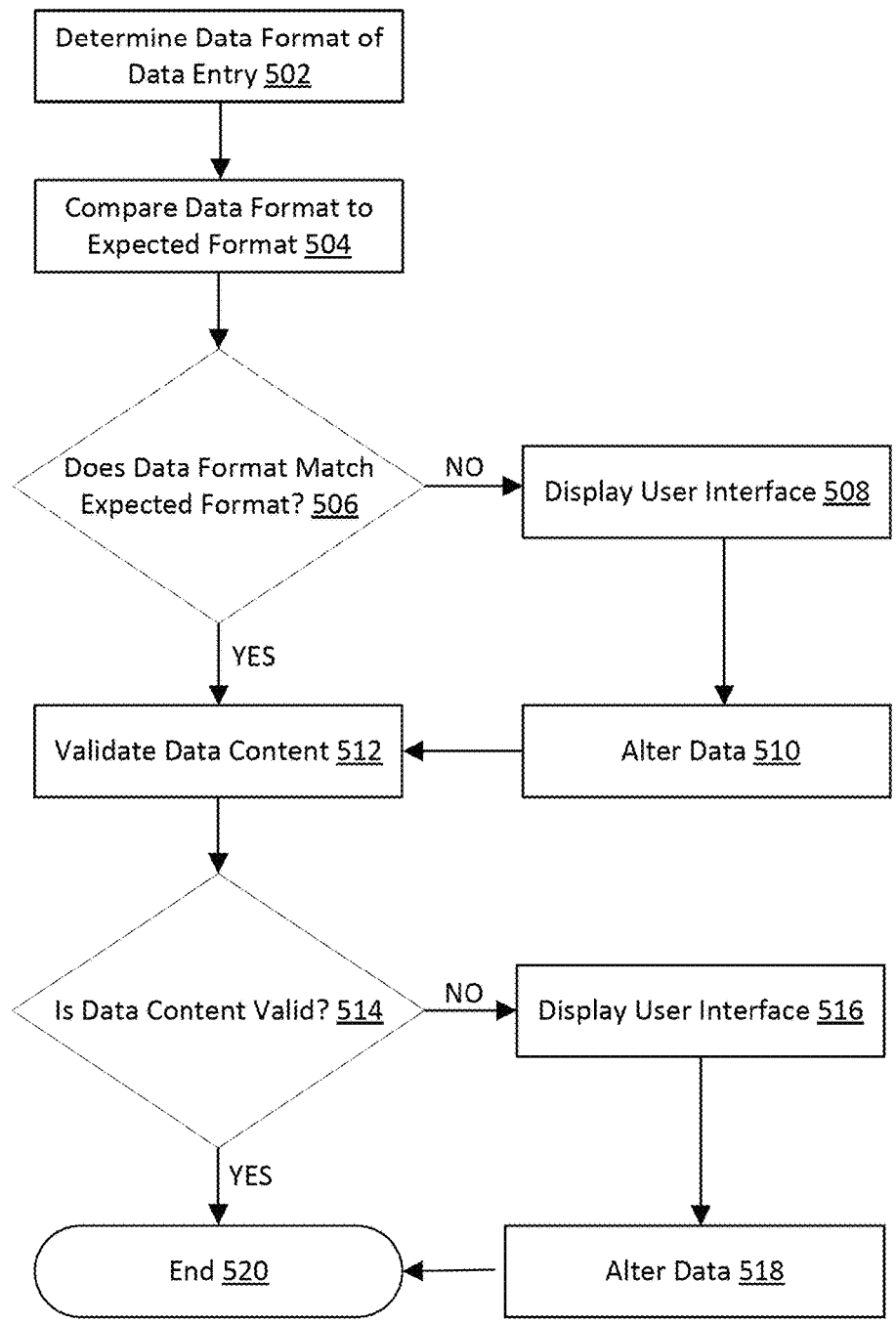
FIG. 5 is a flowchart of an example method for validating data.

The data-ingestion service 102 may receive data from one or more of the entities 104*a*-*x*. The data-ingestion service 102 may process that data by, for example, translating the data to one or more internal schemas, validating the data, and performing other operations. Translating the data to an internal schema may include automatically mapping incoming data fields to internal fields of the internal schema. In some embodiments, the data-ingestion service 102 may generate a user interface for manually translating data that was not automatically ingested. In some embodiments the data-ingestion service 102 will learn from instances that it is unable to automatically ingest data, thereby more efficiently ingesting future incoming data. In some embodiments, the data-ingestion service 102 may output ingested data to one or more downstream systems (e.g., the downstream service 112 and downstream database 114). Aspects of the data-ingestion service 102 are further described below. For example, FIG. 2 illustrates an example architecture of the data-ingestion service 102, and FIGS. 3-5 illustrate example methods that may be performed by the data-ingestion service 102.

The entities 104a-x may be organizations—or computer systems associated with organizations—that are in communication with the data-ingestion service 102. In one example, the entities 104a-x are retailers or restaurants, and the data-ingestion service 102 is associated with an organization that provides a service to the retailers or restaurants, such as a shipping service. Each of the entities 104a-x may have data related to an organization that it is associated with (e.g., store data, product data, personnel data, restaurant data, operations data, etc.), and the entities 104a-x may send that data to the data-ingestion service 102. In some examples, one or more of the entities 104a-x may be related to one another (e.g., different locations or systems of a common retailer). In other examples, one or more of the entities 104a-x may not be related. In some embodiments, a user 108 may directly interact with one or more of the entities 104a-x. For example, if the entity 104a is a computer system, then the user 108 may use the computer system to send data and interact with the data-ingestion service 102.

The CSV files (comma-separated value files) 106a-x depicted in the example embodiment may be sent from the entities 104a-x to the data-ingestion service 102. A CSV file may include a plurality of fields (e.g., columns). Each field may include a field title (e.g., "ID"). The field titles may make up the first row of the CSV file. Additionally, each field may include an expected data format (e.g., the ID field may require six numerical digits). A comma or another delimiter (e.g., semi-colon, dash, etc.) may separate fields. Furthermore, a CSV file may include one or more records (e.g., rows), which may represent the data in the CSV file. Each record may include one or more data entries that include values for one or more of the fields Each new record may start on a new line in the CSV file. In some examples, one or more of the CSV files 106a-x may have a category that corresponds with the type of data in the CSV file. For example, a category of one or more of the CSV files 106a-x may be product, store, or location data. As shown, an entity (e.g., entity 104a) may send multiple CSV files (e.g., 106a-b) to the data-ingestion service (e.g., sending CSV files for different data or sending updated data at different times).

The administrator 110 may manage aspects of the data-ingestion service 102. In some embodiments, the administrator 110 may interact with one or more user interfaces generated by the data-ingestion service 102. In some embodiments, the administrator 110 may interact with the data-ingestion service 102 when the data-ingestion service 102 is unable to automatically ingest an incoming CSV file. For example, the administrator 110 may, in some embodiments, manually map an incoming field of a CSV file to an internal field of an internal schema. Furthermore, in some embodiments, the administrator 110 may correct errors in incoming data.

The downstream service 112 and downstream database 114 may receive ingested data 116 from the data-ingestion service 102. In some examples, the ingested data 116 may be a CSV file. The downstream service 112 may be a system that uses data that is sent from one or more of the entities 104a-x and is ingested by the data-ingestion service 102. In some embodiments, the downstream service 112 may be a system that aggregates and displays data from disparate entities. For example, if the entities 104a-x are retailers, the downstream service 112 may be a system that incorporates data from various retailers. In some embodiments, the downstream service 112 may include a mobile application to facilitate selling or shipping of items from the entities 104a-x. In some embodiments, the downstream service 112 and downstream database 114 may not be configured to directly receive data sent by the entities (e.g., the CSV files 106a-x). Thus, one advantage of the data-ingestion service 102 may be that it can receive such varied data from the entities 104a-x and output data (e.g., the ingested data 116) that may be standardized and that can be processed by the downstream service 112 and downstream database 114. In some embodiments, the downstream service 112 may include the data-ingestion service 102.

The network environment 100 further includes a third-party system 118. In some embodiments, the third-party system 118 may receive a request from the data-ingestion service 102 related to ingesting data. For example, the third-party system 118 may receive a data entry from the data-ingestion service 102, and the third-party system 118 may verify the data entry. For example, the third-party system 118 may be an address or email verification system. As another example, the third-party system may validate that an ID corresponds with an existing item, product, or other entity. In some embodiments, the third-party system 118 may output a response to the data-ingestion service 102. In some embodiments, the response may indicate whether a data entry is valid or invalid, and in some embodiments, the response may include a corrected data entry.

In the network environment 100, the network 120a couples the data-ingestion service 102 with the entities 104a-x. The network 120b couples the data-ingestion service 102 with the downstream service 112 and downstream database 114. The network 120c couples the data-ingestion service 102 with the third-party system 118. Each of networks 120a-c can be, for example, a wireless network, a wired network, a virtual network, the Internet, or any other type of network. Furthermore, each of the networks 120a-c can be divided into subnetworks, and the subnetworks can be different types of networks or the same type of network. In different embodiments, the network environment 100 can include a different network configuration than shown in FIG. 1.

FIG. 2 illustrates a block diagram of aspects of an example architecture of the data-ingestion service 102. As shown in the example of FIG. 2, the data-ingestion service 102 can include components. In some embodiments, the components may include software, hardware, or a combination of software and hardware. Depending on the embodiment, the components and the interactions between components may vary. In some embodiments, one or more of the components may be implemented in a computing environment, such as the computing environment 1102, which is further described below. FIG. 2 illustrates a schematic example of some possible components of the data-ingestion service 102 and aspects of an example configuration of the components. In the example of FIG. 2, the components are described as having certain characteristics and performing certain function. In other examples, the data-ingestion service 102 may have different components than those illustrated, and the components may perform different functions.

Furthermore, although the components illustrated in FIG. 2 are described as ingesting CSV files, such components may also be configured to ingest other types of structured data files.

In the example of FIG. 2, the data-ingestion service 102 includes an orchestrator 202, a schema manager 204, internal schemas 206a-x, a mapping library 208, a general mapping library 210, entity-specific libraries 212a-b, a validation tool 214, a format verifier 216, a content verifier 218, a user interface generator 220, a log manager 222, and a log 224.

In some embodiments, the orchestrator 202 may receive incoming CSV files from the entities 104a-x. In some embodiments, the orchestrator 202 may coordinate the components of the data-ingestion service 102 by calling them and communicating data with them. In some embodiments, the orchestrator 202 may perform one or more of the following actions; selecting an internal schema using the schema manager 204; mapping incoming data to the internal schema using the mapping library 208; validating incoming data using the validation tool 214; generating a user interface using the user interface generator 220; tracking data using the log manager 222; or communicating with a third-party system as part of ingesting data. Furthermore, in some embodiments, the orchestrator 202 may output ingested data to another system, such as a downstream service or database.

The schema manager 204 may receive a request from the orchestrator 202 and may receive an incoming CSV file, or aspects of an incoming CSV file. The schema manager 204 may select an internal schema to which the incoming CSV file may be mapped. In some embodiments, the schema manager 204 may store a plurality of internal schemas 206a-x. In some embodiments, an internal schema may correspond to a template for how data is to be organized or formatted. In some embodiments, an internal schema may correspond to a CSV template. In some embodiments, an internal schema may include a plurality of internal headers. Each of the internal headers may have a header title and an expected format of data belonging to that header. In some embodiments, an internal schema may dictate that data is to be formatted in tabular form, with the internal headers as columns and data records as rows, with data records having a value for one or more of the internal headers. In some examples, each of the internal schemas 206a-x may be used for a different category or type of data. For example, the internal schema 206a may be for item data, the internal schema 206b may be for location data, the internal schema 206x may be for personnel data, and so on. In some embodiments, the schema manager 204 may select one of the internal schemas 206a-x for translating an incoming CSV file based on data of the incoming CSV file (e.g., metadata indicating a category of the incoming CSV file, field titles in the incoming CSV file, or other data). In some embodiments, the schema manager 204 may output the selected internal schema of the plurality of internal schemas 206a-x to the orchestrator 202.

The mapping library 208 may receive a request from the orchestrator 202 or another component of the data-ingestion service 102 to map an incoming CSV file to an internal schema (e.g., the internal schema selected by the schema manager 204). To do so, the mapping library 208 may, in some embodiments, map fields of the incoming CSV file to fields of the internal schema. For example, the mapping library 208 may include data indicating that the fields "Postal Code" and "ZIP," which may be present in the incoming CSV file, are mapped to the field "ZIP Code" in the internal schema. Furthermore, the mapping library 208 may include data indicating that two or more fields of an incoming CSV are mapped to a single field of an internal schema (e.g., mapping the fields "date" and "time" to a single "datetime" field), and the mapping library may indicate that a single field of an incoming CSV file is mapped to multiple fields of an internal schema (e.g., mapping the field "address" to fields for "street address," "city," and "state"). In some embodiments, the mapping library 208 may, for each incoming field of the incoming CSV file, attempt to map the incoming field to at least one internal field of the internal schema. In some embodiments, the mappings of the mapping library 208 may be derived from previous mappings. In some examples, the mapping library 208 may have different mapping data depending on the selected internal schema or depending on the category of data in the incoming CSV file. In some embodiments, the mapping library 208 may output data (e.g., to the orchestrator 202) indicating a plurality of mappings between incoming fields and internal fields and indicating which, if any, incoming or internal fields were not mapped.

In some examples, the mapping library 208 may include a general mapping library 210 that may be applied to a CSV file irrespective of which entity sent the CSV file. Additionally, the mapping library 208 may include one or more entity-specific mapping libraries 212a-b. As is further described below, the mapping library 208 may be updated as the data-ingestion service 102 ingests CSV files. In some embodiments, the data-ingestion service 102 may add a new mapping to the general mapping library 210 and, as a result, the mapping may be applied to a future CSV file irrespective of whether the future CSV file is sent by a different sender. In some embodiments, the data-ingestion service 102 may update the ingestion process for a particular entity. To do so, the data-ingestion service 102 may, in some embodiments, update an entity-specific mapping library (e.g., adding a mapping to one of the entity-specific mapping libraries 212a-b that maps a certain field of an incoming CSV file to a certain internal field for that entity). As a result, the data-ingestion service 102 will apply the new mapping to future CSV files from that entity but not to future CSV files from other entities.

The validation tool 214 may receive data (e.g., data from an incoming CSV file) from the orchestrator 202, and the validation tool 214 may validate that data. In some embodiments, the validation tool 214 may validate the format and content of data entries of an incoming CSV file. In some embodiments, the format verifier 216 may verify that data entries have a format that accords with an expected format of the internal field to which the data entry has been mapped. In some embodiments, the content verifier 218 may verify that the content of a data entry is valid (e.g., if the data entry is in an "address" field, then the content verifier may determine whether the data entry corresponds with an existing address). In some embodiments, the validation tool 214 may output data indicating whether one or more data entries are valid, and if one or more data entries are not valid, then the validation tool 214 may output an error for those entries. Validating data is further described below in connection with FIGS. 3 and 5.

The user interface generator 220 may receive data (e.g., incoming data or fields of a CSV file, internal schema data, validation data, or other data), and may generate one or more user interfaces related to that data. In some embodiments, the one or more user interfaces may be used to display information about a data-ingestion process or to receive user input. Example user interfaces include a user interface for mapping unmapped fields, a user interface for combining or separating fields, a user interface for correcting data errors, and a user interface for receiving CSV files. In some embodiments, the one or more of the user interfaces may receive a user input, which may be received by the data-ingestion service 102. In some embodiments, based on the user input, the orchestrator 202, or another component of the data-ingestion service 102, may update incoming data or update one or more of the components of the data-ingestion service 102 (e.g., updating the mapping library 208 with a mapping received via a user interface). Example user interfaces are further described below in connection with FIGS. 7-10.

The log manager 222 may receive data from the orchestrator 202 or from other components of the data-ingestion service 102 related to ingesting data. The log manager 222 may record data in the log 224. Example data recorded by the log manager 222 may include, but is not limited to, the following, in the context of CSV file ingestion: metadata related to incoming CSV files; metadata related to ingested CSV files; data related to entities that send CSV files; data related to services that receive ingested CSV files; errors encountered while ingesting CSV files; interactions with users or administrators; and other data related to ingesting CSV files.

FIG. 3 is a flowchart of an example method 300 useable by the data-ingestion service 102. In some embodiments, the data-ingestion service 102 may use the method 300 in response to a request to transfer or receive data. In some embodiments, the data-ingestion service 102 may use one or more components described above in the example of FIG. 2 to perform aspects of the method 300. In the example of FIG. 3, the method 300 may relate to ingesting CSV files. However, in other embodiments, one or more aspects of the method 300 may apply to other types of structured data files. For example, aspects of the method 300 (and other aspects of the present disclosure) may, in some embodiments, be used to ingest Optimized Row Columnar (ORC) files, Parquet files, Avro files, or other structured data files.

In the example shown, the data-ingestion service 102 may display a user interface for receiving CSV files (step 302). For example, the data-ingestion service 102 may cause the user interface to be displayed on a device (e.g., computer or mobile phone) associated with one or more of the entities 104a-x. The user interface may include an input field for selecting and uploading one or more CSV files to transmit to the data-ingestion service 102. The user interface may also include data related to an exemplary CSV file format associated with an internal schema that a CSV file will be translated to. An example user interface for receiving CSV files is illustrated and discussed in connection with FIG. 7.

In the example shown, the data-ingestion service 102 may receive a CSV file (step 304). The CSV file may be one of the CSV files 106a-x sent by one of the entities 104a-x, as described in connection with FIG. 1. In some examples, the data-ingestion service 102 may receive the CSV file via the user interface for receiving CSV files. In other examples, the data-ingestion service 102 may receive the CSV file without using the user interface for receiving CSV files. In some examples, the data-ingestion service 102 may receive a plurality of CSV files. Furthermore, the data-ingestion service 102 may also receive data about the CSV file, such as the category of data to which the CSV file relates.

In the example shown, the data-ingestion service 102 may translate the incoming CSV file to an internal schema (step 306). Translating the incoming CSV file to an internal schema may include mapping one or more fields of the incoming CSV file to one or more internal fields of the internal schema. An example of translating the incoming CSV file to an internal schema is further described below in connection with FIG. 4.

In the example shown, the data-ingestion service 102 may validate incoming data of the CSV file (step 308). In some embodiments, validating the incoming data may include validating one or more of a content or a format of data entries in the incoming CSV file. An example of validating data is further described below in connection with FIG. 5.

In the example shown, the data-ingestion service 102 may transmit an ingested CSV file (step 310). In some embodiments, the data-ingestion service 102 may transmit the ingested data 116 to the downstream service 112 or downstream database 114. The ingested CSV file may include data that corresponds to the data in the incoming CSV file. Additionally, the fields of the ingested CSV file may correspond with internal fields of the internal schema to which the incoming CSV file was mapped. Additionally, the ingested data CSV file may include data that has been validated by the data-ingestion service 102.

FIG. 4 is a flowchart of an example method 400 for translating a structured data file, such as a CSV file, from a different external schema to an internal schema. In some embodiments, aspects of the method 400 may be used by the data-ingestion service 102 to perform step 306 of the method 300.

In the example shown, the data-ingestion service 102 may select an internal schema (step 402). For example, based on a category or type of data in the incoming CSV file (e.g., based on metadata of the incoming CSV file, based on a recognition of one or more incoming fields of the CSV file, or based on other data), the data-ingestion service 102 may select one of a plurality of internal schemas. Example internal schemas include product data, store data, restaurant data, personnel data, general entity or organizational data, or other data that may be received and processed by the data-ingestion service 102.

In the example shown, the data-ingestion service 102 may determine whether there is an entity-specific mapping library corresponding to the entity that sent the CSV file (step 404). To determine whether such an entity-specific mapping library exists, the data-ingestion service 102 may, in some embodiments, determine a sender of the incoming CSV file (e.g., based on metadata or other data) and determine whether the sender is associated with an entity-specific mapping library in the mapping library. In response to determining that there is an entity-specific mapping library corresponding to the entity that sent the CSV file (e.g., taking the "YES" branch from step 404 to step 406), the data-ingestion service 102 may select that entity-specific mapping library (step 406). In response to determining that there is not an entity-specific mapping library corresponding to the entity that sent the CSV file, then the data-ingestion service 102 may skip step 406 (e.g., taking the "NO" branch from step 404 to step 408).

In the example shown, the data-ingestion service 102 may map incoming fields to internal fields (step 408). For example, the data-ingestion service 102 may apply aspects of the mapping library to the fields of the incoming CSV file. In some instances, some fields of the incoming CSV file may have the same field title as certain fields of the internal schema, or there may be a slight difference (e.g., different capitalization, misspellings, hyphens, or other small changes). The mapping library may, in some embodiments, include mappings for these fields (e.g., the mapping library may have a mapping indicating that the incoming field "Name" maps to the internal field "Name," or a mapping that indicates that an incoming field "country" maps to the internal field "Country"). Furthermore, in some embodiments, if fields in the incoming CSV file are in a different order than fields in the internal schema (e.g., an "ID" field in the incoming CSV file is in a second position, whereas a corresponding "ID" field in the internal schema is in a first position), then the data-ingestion service 102 may change the order to match the internal schema. In some embodiments, the mapping library may indicate that, for some fields, any one of a plurality of possible incoming fields is mapped to a certain internal field. For example, the mapping library may indicate that the fields "ZIP," "ZIP Code." "Postal Number," "Post Code." "Postal Code," and possibly other field titles are all mapped to an internal "ZIP" field. Thus, if any of those fields are detected in the incoming CSV file, they will be appropriately mapped. Furthermore, as described above, the mapping library may include data indicating that certain incoming fields are to be mapped to two or more internal fields, or that a combination of two or more incoming fields are to be mapped to a single internal field. In some embodiments, the data-ingestion service 102 may use a general mapping library irrespective of which entity sent the CSV file. In some embodiments, if there is an available entity-specific library, then the data-ingestion service 102 may use that library in addition to, or instead of, a general mapping library. For example, if a specific entity uses a specific CSV format that the entity has used in the past, then the data-ingestion service 102 may learn how that specific format may be translated to an internal schema (e.g., which incoming CSV fields must be mapped to which internal fields and how the data may be appropriately altered to correspond with an internal format). As a result, when that entity sends a future CSV file having the same format, that CSV file may be automatically and efficiently processed.

In the example shown, the data-ingestion service 102 may determine whether there are unmapped fields (step 410). For example, if after having mapped incoming fields to internal fields, there is a field of the incoming CSV field that is not mapped to an internal field, then the data-ingestion service 102 may proceed to step 412 (e.g., taking the "YES" branch from step 410 to step 412). For example, the data-ingestion service 102 may have failed to map one or more incoming fields to any of the plurality of internal fields. If the data-ingestion service 102 determines that all fields are mapped, then the data-ingestion service 102 may proceed to step 416 (e.g., taking the "NO" branch from step 410 to step 416).

In the example shown, the data-ingestion service 102 may display a mapping user interface (step 412). The mapping user interface may include data related to unmapped fields, and the mapping user interface may include one or more input fields for mapping the unmapped fields. In some examples, the mapping user interface may be displayed to an administrator or user of the data-ingestion service 102, or the user interface may be displayed to a user that is associated with the entity that sent the CSV file. An example mapping user interface is illustrated and described in connection with FIG. 8.

In the example shown, the data-ingestion service 102 may map an unmapped field to a selected field (step 414). For example, via the mapping user interface, the data-ingestion service 102 may receive a user input corresponding to a selection of an internal field to map an unmapped incoming field to. In response, the data-ingestion service 102 may perform the mapping and other operations according to the selected mapping. For example, if an incoming field entitled "Lat." is unmapped, then the user may select, via the mapping user interface, to map that field to a selected internal field entitled "Latitude." The data-ingestion service may receive the user-defined mapping and update the data accordingly. Furthermore, in some embodiments, the mapping user interface may display a plurality of unmapped fields.

In the example shown, the data-ingestion service 102 may determine whether there are one or more incoming fields to combine or separate (step 416). For example, the data-ingestion service 102 may detect that, although an incoming field cannot be mapped on a one-to-one basis with an internal field, the incoming field may be able to be separated into multiple internal fields, but the data-ingestion service 102 may not know which internal fields. In such a situation, the data-ingestion service 102 may determine that there are fields to combine or separate. Additionally, in some examples, a user may indicate, for example via the mapping user interface, that one or more fields are to be combined or separated to match the internal fields. In response to determining that there are one or more incoming fields to combine or separate, the data-ingestion service 102 may proceed to step 418. (e.g., taking the "YES" branch). In response to determining that there are not any incoming fields to combine or separate, the data-ingestion service 102 may proceed to step 422 (e.g., taking the "NO" branch).

In the example shown, the data-ingestion service 102 may display a combination-separation user interface (step 418). The combination-separation user interface may include one or more incoming fields and one or more input fields for combining incoming fields into a single internal field or separating an incoming field into multiple internal fields. An example combination-separation user interface is illustrated and described in connection with FIG. 8.

In the example shown, the data-ingestion service 102 may combine or separate fields (step 420). For example, the data-ingestion service 102 may receive an input via the combination-separation user interface that indicates that one or more fields are to be separated or combined. In response, the data-ingestion service 102 may combine or separate the fields and take other actions according to the input.

In the example shown, the data-ingestion service 102 may generate data (step 422). For example, the data-ingestion service 102 may generate data based on the data of the incoming CSV file. For example, even if the data in the incoming CSV file does not include certain data, that data may nevertheless be inferred by data-ingestion service 102 based on the other data. For example, the data-ingestion service 102 may determine a latitude and longitude of a location based on an address that is provided in the incoming CSV file. As another example, the data-ingestion service 102 may correct mistakes in the incoming data (e.g., typographical errors or errors that the data-ingestion service 102 has previously encountered). As another example, the data-ingestion service 102 may perform calculations on the incoming data (e.g., conversions or other mathematical operations). For example, the incoming CSV file may include a price per pound field, and the internal schema may include a price per ounce field. Rather than flagging an error or flagging the incoming field as unmapped, the data-ingestion service 102 may, in some embodiments, map the price per pound field to the price per ounce field and automatically convert the data entries in that field to the appropriate measurement. In some examples, the data-ingestion service 102 may use a third-party service to generate data. Having generated data, the data-ingestion service 102 may, in some embodiments, add the generated data to the CSV file.

In the example shown, the data-ingestion service 102 may update a mapping library (step 424). For example, the data-ingestion service 102 may update the mapping library to include any user input mapping an unmapped field to a selected field or any user input combining or separating incoming fields to internal fields. For example, if the incoming field "Sector" is unable to be automatically mapped by the data-ingestion service 102 to any internal field, and if a user, via the mapping user interface, maps "Sector" to the internal field "Department," then the data-ingestion service 102 may update the mapping library to include the mapping of "Sector" to "Department." As a result, the data-ingestion service 102 may apply the mapping of "Sector" to "Department" to future CSV files, thereby automatically translating, in some embodiments, that field without user intervention for future incoming CSV files. Likewise, for fields that were separated and combined by a user via a user interface, the data-ingestion service 102 may learn these separations and combinations and add them to the mapping library, so that for future incoming CSV files, these fields are appropriately combined or separated. Furthermore, in some embodiments, the data-ingestion service 102 may update an entity-specific mapping library instead of—or in addition to—to a general mapping library or a different mapping library.

FIG. 5 is a flowchart of an example method 500 for validating data. For example, aspects of the method 500 may be used by the data-ingestion service 102 to perform aspects of step 308 of the method 300. As described above, the data of a structured data file, such as an incoming CSV file, may be made up of one or more records (e.g., rows under a header row). Each record may include one or more data entries for one or more fields (e.g., data values in cells that make up the row). In some examples, the data-ingestion service 102 may perform the aspects of the method 500 on a data entry of a record. Furthermore, the data-ingestion service 102 may repeat the method 500 for more than one data entry of a record and for more than one record in a CSV file, thereby validating a plurality of values. In some examples, the data-ingestion service 102 may repeat the method 500 in a loop, for each record in the incoming CSV file and for each data entry in a record. Additionally, in some examples, the data-ingestion service 102 may validate data entries in batches. For example, the data-ingestion service 102 may apply aspects of the method 500 on a plurality of data entries at the same time (e.g., by validating a plurality of data entries of a record at the same time, or by validating a plurality of data entries belonging to a field at the same time).

In the example shown, the data-ingestion service 102 may determine a data format of the data entry (step 502). The data format may include one or more of the number, type, or position of characters used. The following are examples: if a data entry is "56720," then the data-ingestion service 102 may recognize that the data format is five consecutive digits; if the data entry is "locationinfo@site.com," then the data-ingestion service 102 may determine that the data entry has a format of an email address; and if the data entry is "true," then the data-ingestion service 102 may recognize that the data format is a Boolean.

In the example shown, the data-ingestion service 102 may compare the data format of the data entry to an expected format (step 504). To determine the expected format, the data-ingestion service 102 may determine which internal field a data entry was mapped to. For example, an incoming CSV file may have a field "Postal Code," and as described above, the data-ingestion service 102 may have mapped the field "Postal Code," to an internal field "ZIP." The incoming CSV file may have a plurality of records, one or more of which may have a data entry for "Postal Code," such as "56720." Thus, following the mapping of "Postal Code" to "ZIP," the expected format of the data entry "56720" may be the format that is associated with the internal field "ZIP." For example, the internal field ZIP may expect that the format of entries is five consecutive digits, nine digits with a hyphen after the fifth digit, or either one of these formats. The data-ingestion service 102 may compare this expected format with the format of the data entry.

In the example shown, the data-ingestion service 102 may determine whether the data format of the data entry matches the expected format (step 506). In response to determining that the formats match, the data-ingestion service 102 may proceed to step 512 (e.g., taking the "YES" branch from step 506 to step 512). In response to determining that the formats do not match, the data-ingestion service 102 may proceed to step 508 (e.g., taking the "NO" branch from step 506 to step 508).

In the example shown, the data-ingestion service 102 may display a format-error user interface (step 508). The format-error user interface may include one or more of the data entry, an error message, the expected format, the internal field that the data entry is mapped to, and an input field for changing the data entry. Aspects of an example format-error user interface are illustrated and described in connection with FIG. 10. In the example shown, the data-ingestion service 102 may alter the data entry (step 510). For example, the data-ingestion service 102 may receive a user input via the format-error user interface. In response to receiving the user input, the data-ingestion service 102 may alter the data entry. For example, if the user input changes the data entry from "Mar. 3, 2020" to "2020-3-3," then the data-ingestion service 102 may alter a data file to incorporate this change.

In the example shown, the data-ingestion service 102 may validate the content of a data entry (step 512). For example, the data-ingestion service 102 may, in some embodiments, validate whether the data itself as opposed to the format of the data—is valid. For instance, if the data entry is in a field titled "UPC," then the data-ingestion service 102 may validate whether the value of the data entry actually corresponds with a valid universal product code. As another example, the data-ingestion service 102 may validate whether a data entry in an "Address," "State," or "ZIP" field actually corresponds with a valid address, state, or ZIP code. To perform the validation, the data-ingestion service 102 may, in some embodiments, use a third-party service, such as a service that validates addresses or universal product codes. Additionally, for some fields, the data-ingestion service 102 may use an internal service to validate the data content. Furthermore, for some fields, the data-ingestion service 102 may forgo validating the content of a data entry, for example if the values of a field are not restricted (e.g., a "Description" field) or if the data entry is empty.

In the example shown, the data-ingestion service 102 may determine whether the data content is valid (step 514). In response to determining that the data-ingestion service 102 is valid the data-ingestion service may end the method 500 (e.g., taking the "YES" branch from step 514 to step 520). In response to determining that the content is not valid, the data-ingestion service may proceed to step 516 (e.g., taking the "NO" branch from step 514 to step 516).

In the example shown, the data-ingestion service 102 may display a content-error user interface (step 516). The content-error user interface may include one or more of the data entry, an error message, and an input field. Aspects of an example content-error user interface are illustrated and described in connection with FIG. 10. In the example shown, the data-ingestion service 102 may alter the data entry (step 518). For example, the data-ingestion service 102 may receive a user input via the content-error user interface. In response to receiving the user input, the data-ingestion service 102 may alter the data entry in accordance with the user input. In some examples, the data-ingestion service 102 may end the method 500 (step 520) and may repeat aspects of the method 500 for other data entries of a CSV file (e.g., another batch of data of the CSV file, or data entries from a different CSV file).

In some examples, the data-ingestion service 102 may check the data entry for a format error and a content error in one step. If the data-ingestion service 102 determines that there is an error, then for either format or content, or both, the data-ingestion service 102 may display an error user interface. For example, the content-error user interface and the format-error user interface may be combined into one or more user interfaces. Additionally, the data-ingestion service 102 may receive a user input correcting a format error and a content error via the one or more combined user interfaces.

Figure 6:
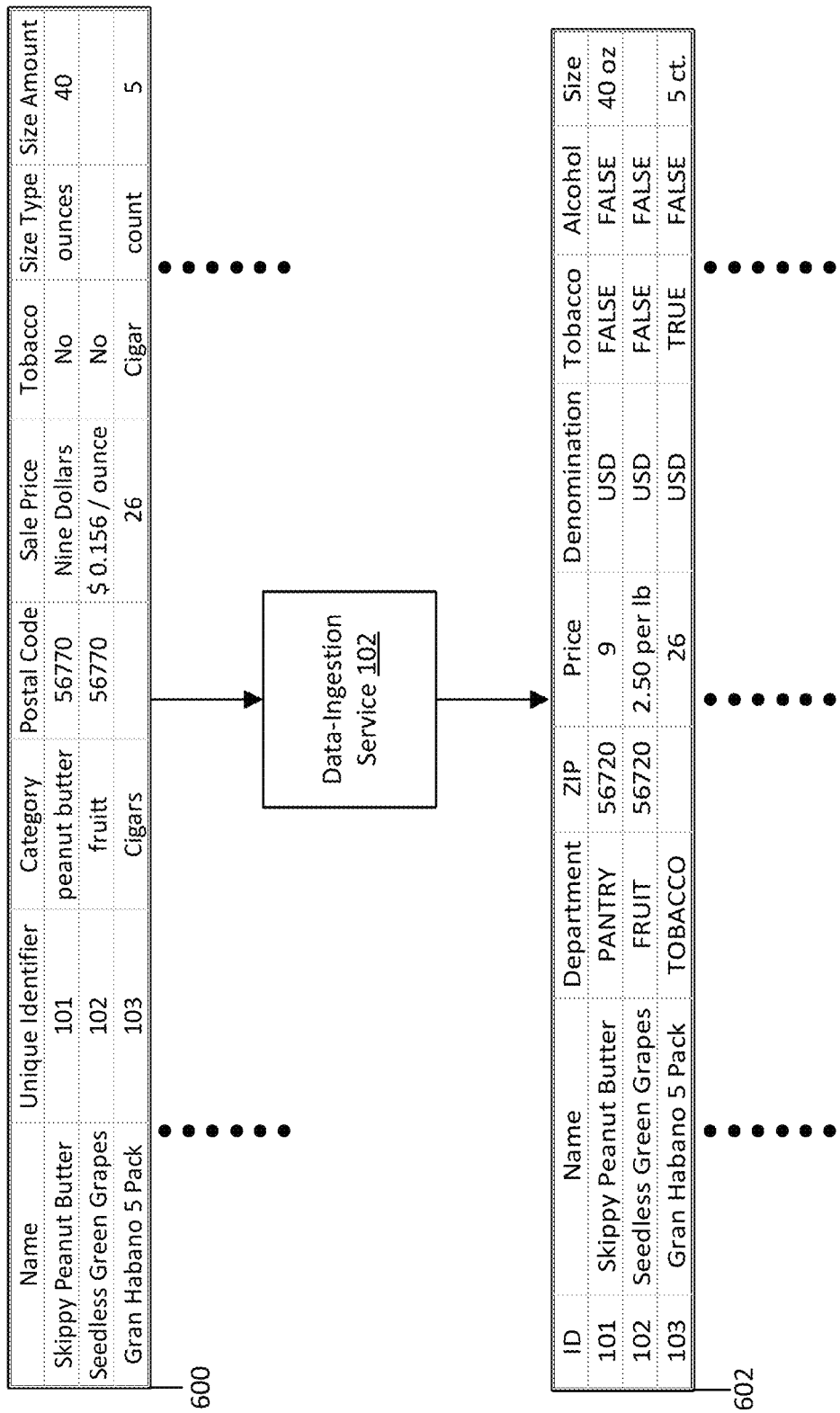
FIG. 6 illustrates example data received and ingested by the data-ingestion service.

FIG. 6 illustrates example data received and ingested by the data-ingestion service 102. FIG. 6 includes example aspects of an incoming CSV file 600, the data-ingestion service 102, and example aspects of an ingested CSV file 602. For examples, the incoming CSV file 600 may be received from one of the entities 104*a-x*, and the ingested CSV file 602 may be sent to a downstream service 112 or downstream database 114.

As shown in the example of FIG. 6, the incoming CSV file 600 includes a plurality of fields (e.g., "Name," "Unique Identifier," etc. . . . ), a plurality of records (e.g., the rows starting with "Skippy Peanut Butter," "Seedless Green Grapes," etc. . . . ), and data entries corresponding to a value of a record for a field. The incoming CSV file 600 may have been sent, for example, from a retailer, and the CSV file 600's category may be related to product data. As can be appreciated, a CSV file such as the CSV file 600 may include many more fields than those illustrated in the example of FIG. 6 and may include thousands or hundreds of thousands of rows, making any manual interaction directly with the CSV file both unwieldy and time consuming. Furthermore, even if a script is written to parse such a CSV file, that script may be time-consuming to write, it may be of limited utility for data received from other senders, it may not be easily alterable, and it may be limited to a certain category of data.

As shown, the data-ingestion service 102 may receive the incoming CSV file 600 and perform operations on it (e.g., as described above in connection with FIGS. 2-5) to convert it into the ingested CSV file 602. The ingested CSV file 602 includes a plurality of internal fields (e.g., "ID," "Name," etc. . . . ) of an internal schema selected by the data-ingestion service 102. The data-ingestion service 102 may have mapped fields of the incoming CSV file 600 to the internal fields of the ingested CSV file 602 (e.g., mapping "Unique Identifier" to "ID"; "Sale Price" to "Price" and "Denomination"; "Size Type" and "Size Amount" to "Size"; and so on). By applying aspects of the mapping library, the data-ingestion service 102 may have performed one or more of the mappings automatically without manual intervention. Additionally, the data-ingestion service 102 may have displayed a user interface for a user to map one or more the fields. As shown, in some examples, the data-ingestion service 102 may transpose, combine, and separate fields, as well as map fields that do not have the same field title.

As shown, the data in the ingested CSV file 602 corresponds with the data in the incoming CSV file 600. The data-ingestion service 102 may have performed one or more operations on the data of the incoming CSV file. For example, the data-ingestion service 102 may have validated a format of one or more data entries of the incoming CSV file (e.g., validating that data entries being mapped to the "ID" field include a certain amount of numbers, or validating that the data entries belonging to "Tobacco" are Boolean values). If one or more of the data formats were not verified, then the data-ingestion service 102 may have displayed a user interface for a user to fix the data entry. Additionally, as shown, the data-ingestion service 102 may have validated content of data entries (e.g., validating that the data entries mapped to "ZIP" are, in fact, valid ZIP codes). Furthermore, the data-ingestion service may have performed other operations, such as generating data based on the incoming data (e.g., converting price per ounce to price per pound or, although not shown, inferring geocoordinates from an address). Additionally, the data-ingestion service 102 may have verified that a record in the incoming data included any required data, if the internal schema included required data (e.g., requiring that there be a field that is mapped to "ID"). However, as shown, the data-ingestion service 102 may have permitted that there not be data for some fields for some records (e.g., no "ZIP" data entry for the third row in the ingested CSV file 602).

Figure 7:
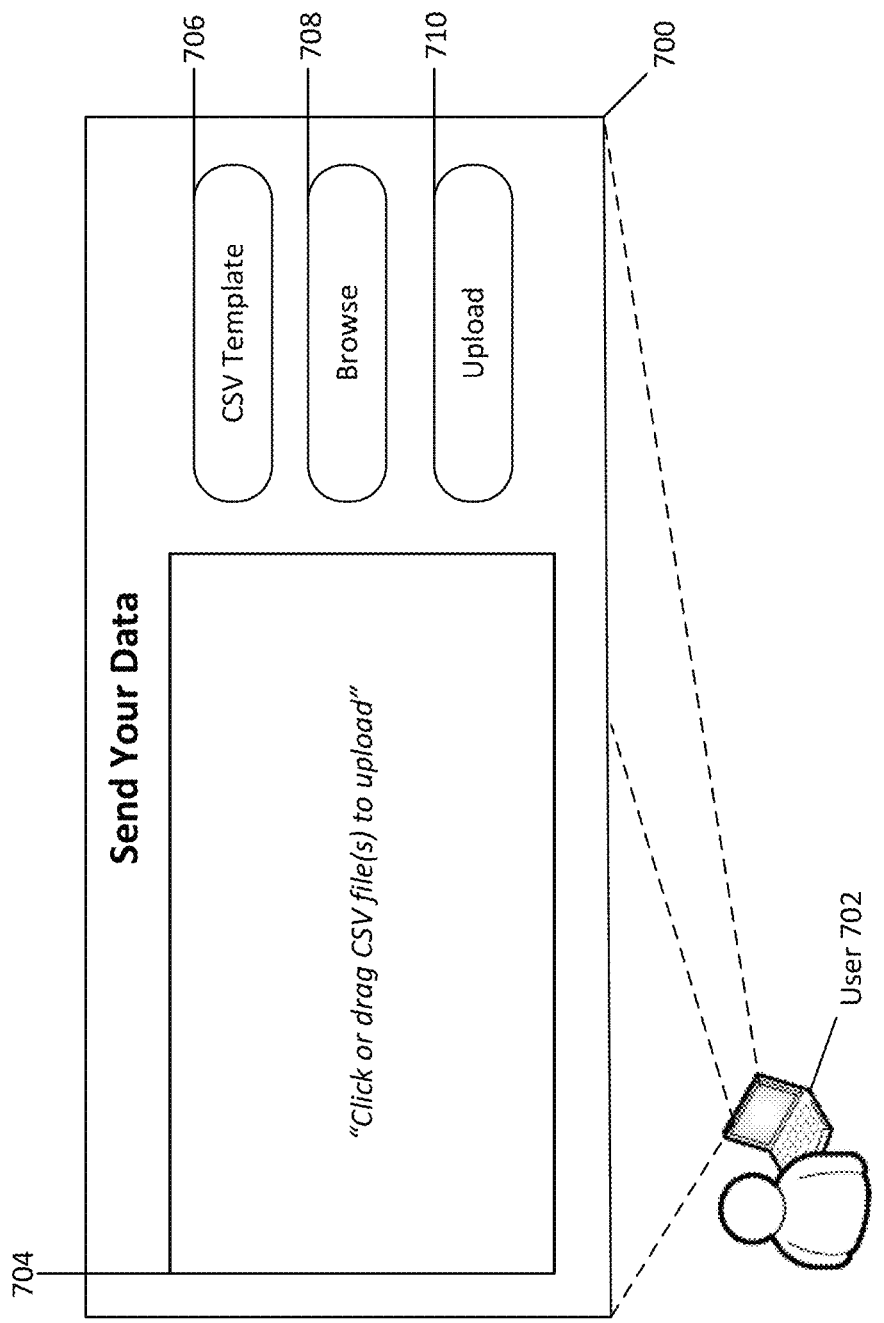
FIG. 7 illustrates an example user interface for receiving data.

FIG. 7 illustrates an example user interface for receiving data. FIG. 7 includes a receiving user interface 700 and a user 702. The receiving user interface 700 includes a drag-and-drop upload area 704, a view-template input field 706, a browse input field 708, and an upload input field 710.

In some examples, the data-ingestion service 102 may display the receiving user interface 700 prior to receiving a data file. For example, an entity may make a request to the data-ingestion service 102—or to a system associated with the data-ingestion service 102—and in response, the data-ingestion service 102 may display the user interface 700. The data-ingestion service 102 may then receive one or more data files, such as CSV files, via the user interface 700. In some examples, however, the data-ingestion service 102 may receive CSV files without using the user interface 700.

The user 702 may be a user associated with an entity that sends data to the data-ingestion service. For example, the user 702 may be the same as the user 108 of FIG. 1. In some examples, an entity may send data to the data-ingestion service 102 without a user (e.g., if an entity's system is configured to automatically send data to the data-ingestion service 102 at certain time intervals or in response to certain events). In some examples, the receiving user interface 700 may be displayed on a device (e.g., computer or mobile device) that is accessible to the user 702.

The user 702 may transmit data to the data-ingestion service 102 by using the receiving user interface 700. For example, the user 702 may select one or more CSV files, drag the CSV files to the drag-and-drop upload area 704, and release the one or more files. Additionally, the user may select one or more CSV files to transmit to the data-ingestion service 102 by using the browse input field 708, which, when selected by a user click or touch, permits the user 702 to search computer storage for the one or more CSV files. Having selected one or more CSV files to transmit, the user 702 may select (e.g., by click or touch) the upload input field 710 to transmit the selected one or more CSV files to the data-ingestion service 102.

In the example of FIG. 7, the user 702 may select the view-template input field 706 to view a CSV template. For example, by selecting the view-template input field 706, a CSV template may be displayed over the receiving user interface 700, or a CSV template may be downloaded. The CSV template may correspond to an internal schema of the data-ingestion service 102. Thus, the user 702, or an entity associated with the user 702, may use the CSV template as an example of what the data-ingestion service 102 is expecting. The internal schema related to the CSV template may depend on the type of data that the user is transmitting via the receiving user interface 700 (e.g., the template may vary depending on whether the user 702 is uploading product data, store data, or another type of data). In some embodiments, the view-template input field 706 may display a different file format than a CSV file.

Figure 8:
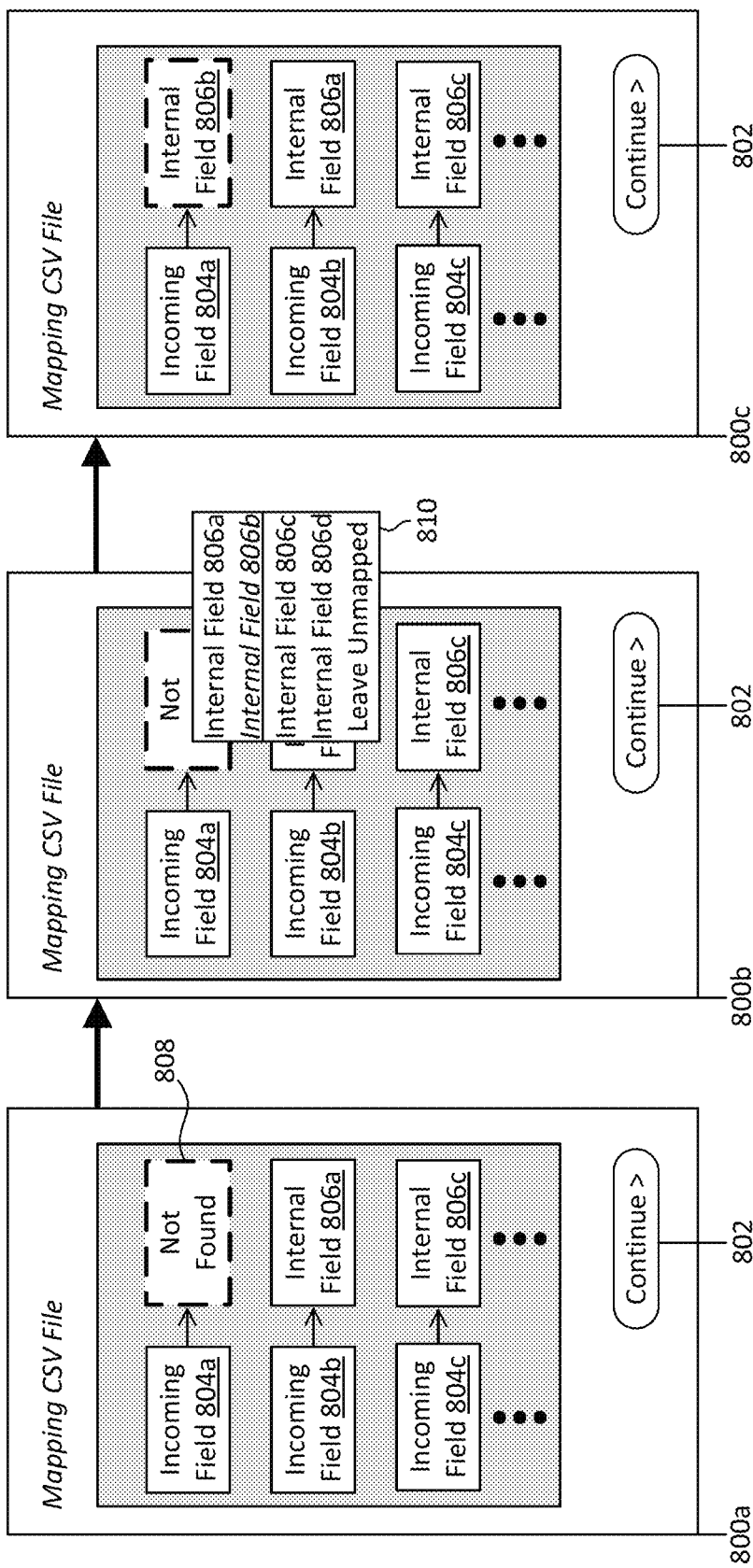
FIG. 8 illustrates an example user interface for mapping data fields.

FIG. 8 illustrates a plurality of mapping user interfaces 800a-c. In some embodiments, each of the user interfaces 800a-c may represent an instance of a user interface for mapping incoming fields 804a-c of an incoming CSV file to internal fields 806a-d of an internal schema. In other embodiments, mapping user interfaces 800a-c may include mapping data for file types other than CSV files. As shown, the mapping user interfaces 800a-c may include more fields than those illustrated (e.g., there may be as many fields as present in an incoming CSV file or in an internal schema). The mapping user interfaces 800a-c further include an input field 802, which may be a button or other input field that, when selected, may transition between instances of the mapping user interfaces 800a-c or, in some embodiments, cause the data-ingestion service 102 to proceed to another step of the data ingestion process. One or more of the mapping user interfaces 800a-c may also include an option to combine or separate incoming fields. If selected, the data-ingestion service 102 may display an interface for combining or separating input fields, an example of which is further described below in connection with FIG. 9. An example of the mapping user interface is further described above in connection with step 412 of FIG. 4.

The mapping user interface 800a may be displayed by the data-ingestion service 102 as part of ingesting an incoming CSV file. For instance, the data-ingestion service 102 may attempt to map incoming fields of an incoming CSV file to internal fields of an internal schema, as described above in connection with, for example, the step 408 of FIG. 4. In response to detecting that one or more incoming fields are not mapped to an internal field, the data-ingestion service may display a user interface, such as the mapping interface 800a. The mapping interface 800a illustrates that incoming field 804a is not mapped to a corresponding internal field and, in the embodiment shown, the mapping interface 800a includes a selectable field 808 indicating that the incoming field 804a was not mapped to an internal field. The example of FIG. 4 further illustrates that the incoming fields 804b and 804c were mapped to the internal fields 806a and 806c, respectively.

The mapping interface 800b may be displayed in response to a user selection (e.g., click or touch) of the selectable field 808 in the mapping interface 800a. The mapping interface 800b includes an internal field selection option 810. The internal field selection option 810 may include a plurality of internal fields, one or more of which may be selected to map the unmapped incoming field 804a to. Furthermore, in some embodiments, a user may elect to leave an incoming field as unmapped to any internal fields. In the example of FIG. 8, the internal field selection option 810 is a drop-down list. In the example of FIG. 8, a user may interact with the drop-down list (e.g., by clicking, touching, scrolling) to select an option for mapping the incoming field 804a. In some embodiments, the internal field selection option 810 may be a different type of input field than a drop-down list. For example, the internal field selection option 810 may be an input field for receiving text. As illustrated in the example of FIG. 8, a user may select the internal field 806b. In some embodiments, a user may map each incoming field that was not automatically mapped to an internal field.

The mapping interface 800c may be displayed in response to a user selection in the internal field selection option 810. The mapping interface 800c illustrates that the incoming field 804a is mapped to the internal field 806b. In some embodiments, as is further described above, the data-ingestion service 102 may update a mapping library to map the incoming field 804a to the internal field 806b. As a result, in some embodiments, the data-ingestion service 102 may, for future CSV files, automatically map the incoming field 804a to the internal field 806b without manual input. In some embodiments, a user may select the input field 802 to proceed to another step in the data-ingestion process. In some embodiments, the data-ingestion service 102 may verify that the incoming fields are mapped in response to a user selecting the input field 802.

Figure 9:
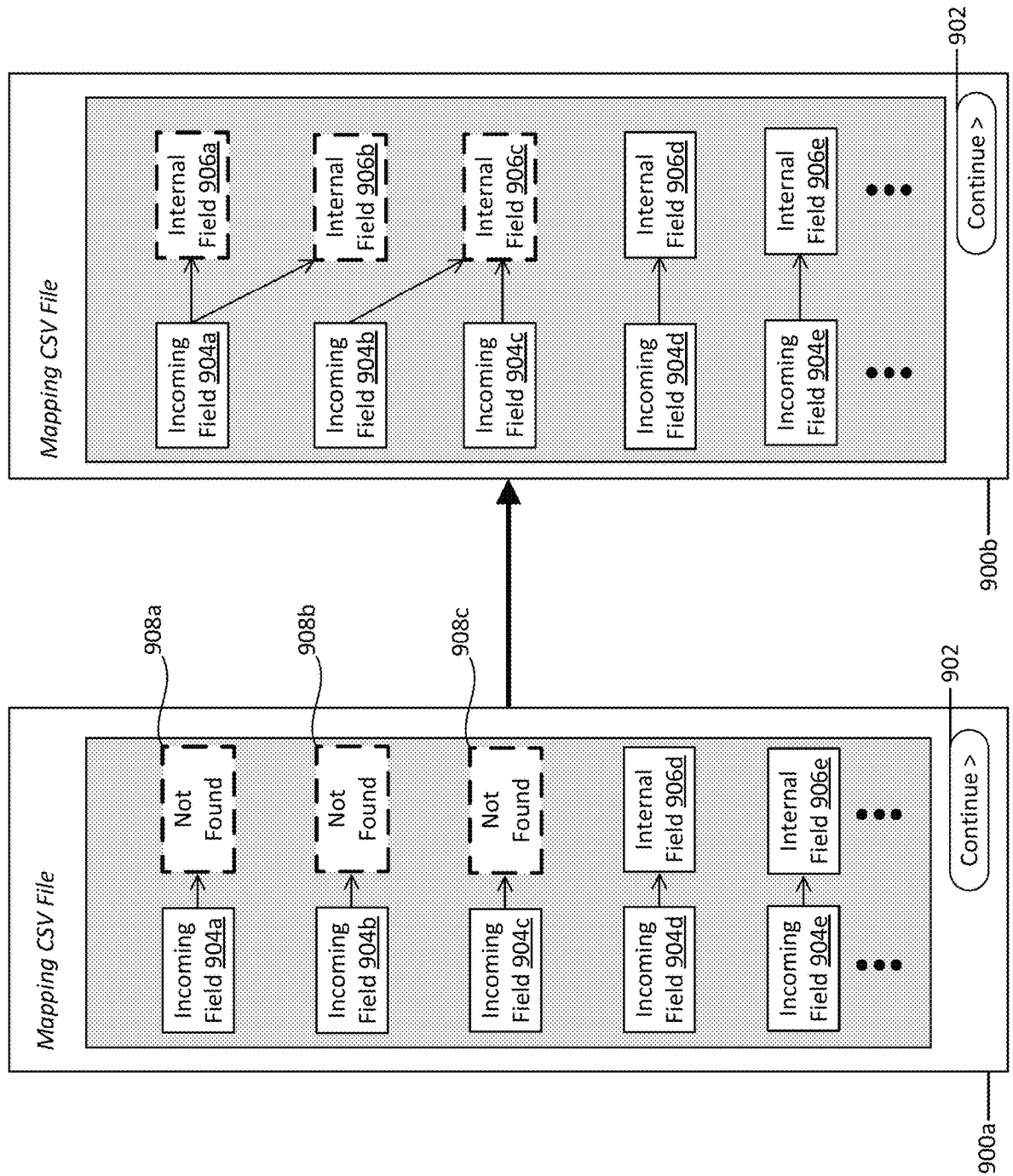
FIG. 9 illustrates an example user interface for validating data.

FIG. 9 illustrates a plurality of combination-separation user interfaces 900a-b. In some embodiments, each of the combination-separation user interfaces 900a-b may represent an instance of a user interface for combining or separating incoming fields 904a-e of an incoming CSV file (other file type) to internal fields 906a-e of an internal schema. The combination-separation user interfaces 900a-b may include more incoming fields and internal fields than those illustrated. The combination-separation user interfaces 900a-b further include an input field 902, which may be a button or other input field. In response to a selection of the input field 902, the data-ingestion service 102 may, in some embodiments, transition from the combination-separation user interface 900a to the combination-separation user interface 900b, or data-ingestion service 102 may, in some embodiments, proceed to another step of the data ingestion process. Example aspects of the combination-separation user interface are further described above in connection with step 418 of FIG. 4.

The combination-separation user interface 900a may be displayed by the data-ingestion service 102 in response to determining that there may be one or more incoming fields 904a-e that may be combined or separated. In some embodiments, the data-ingestion service 102 may display the combination-separation user interface 900a after mapping (or attempting to map) one or more of the incoming fields 904a-e to the internal fields 906a-e. In the example shown, the incoming fields 904a-c are unmapped. In some embodiments, a user may interact with the selectable fields 908a-c to combine or separate the incoming fields 904a-c. For example, a user may select (e.g., by click or touch) the selectable field 908a, which may cause the data-ingestion service 102 to display a field for selecting one or more internal fields to map the incoming field 904a to (e.g., a check list, a drop-down list, a text input, or another input type). In some embodiments, a user may select one or more arrows illustrating a mapping between incoming and internal fields and alter the one or more arrows (e.g., altering an arrow to point from the incoming field 904b to the internal field 906c).

The combination-separation user interface 900b illustrates an example of how one or more incoming fields 904a-c may be combined or separated. For example, as shown, the incoming field 904a may be separated to the internal field 906a and the internal field 906b (e.g., the incoming field 904a may be "Datetime," which may be separated to the internal field 906a, which may be "Date," and the internal field 906b, which may be "Time"). Furthermore, in the example shown, the incoming fields 904a-b may be combined into the internal field 906c.

In some embodiments, as is further described above, the data-ingestion service 102 may update a mapping library to include a mapping from the incoming field 904a to two internal fields; the internal field 906a and the internal field 906b. Similarly, in some embodiments, the data-ingestion service 102 may update a mapping library to include a mapping that combines the incoming fields 904b-c into the internal field 906c. As a result, in some embodiments, the data-ingestion service 102 may automatically perform these combinations and separations without manual input when ingesting CSV files having one or more of the fields 904a-e to an internal schema having the fields 906a-c. Furthermore, in some embodiments, the data-ingestion service 102 may learn not only which fields to combine or separate but may also learn how to combine or separate data belonging to fields.

Figure 10:
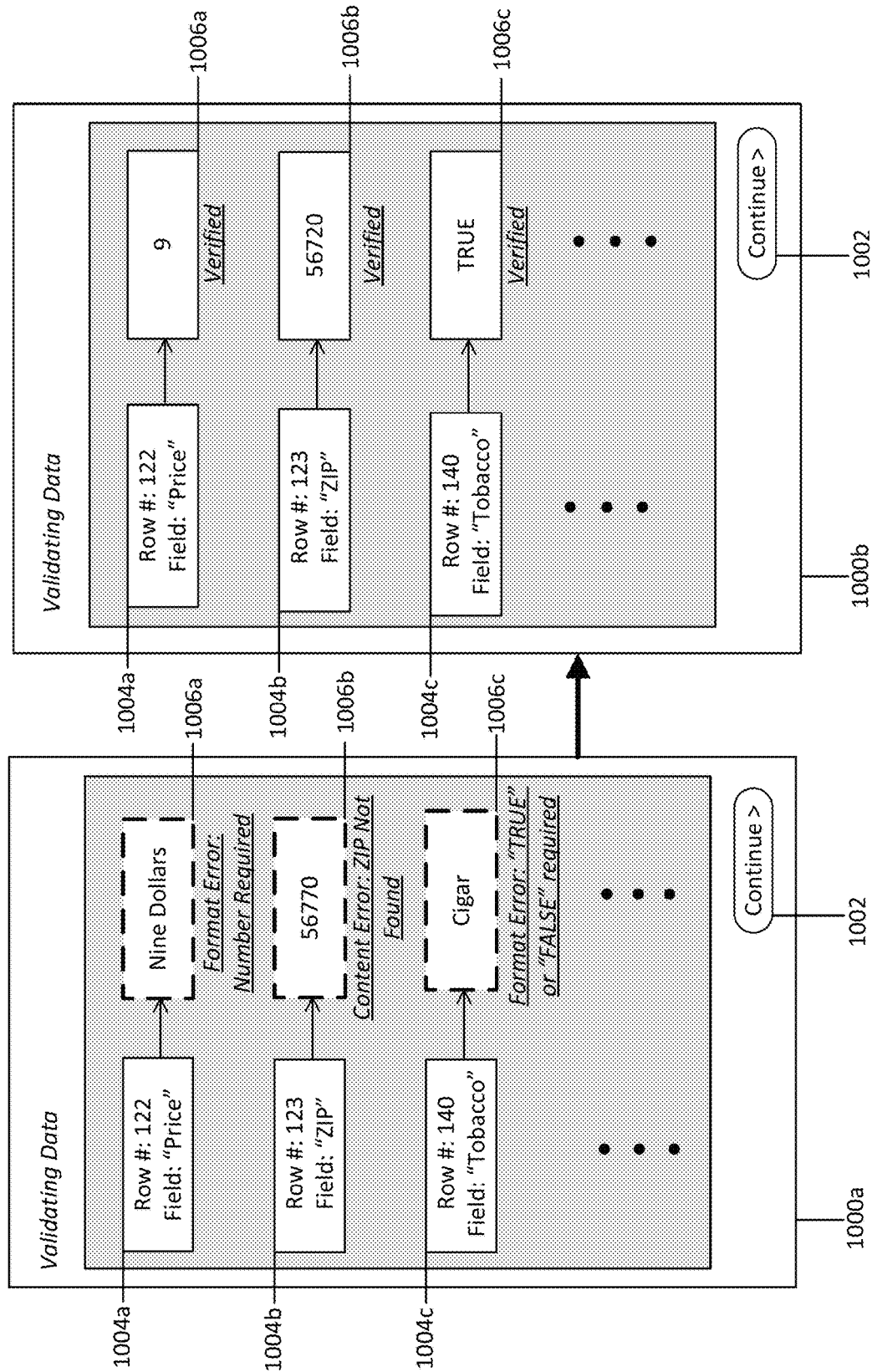
FIG. 10 illustrates an example user interface for combining and splitting fields.

FIG. 10 illustrates a plurality of error user interfaces 1000a-b. The error user interfaces 1000a-b include a plurality of incoming data locations 1004a-c and a plurality of incoming data entries 1006a-c. The error user interfaces 1000a-b further include an input field 1002, which may be a button or other input field that, when selected, may cause a transition from the error user interface 1000a to the error user interface 1000b or, in some embodiments, cause the data-ingestion service 102 to proceed to another step of the data ingestion process. Aspects of the error user interfaces 1000a-b are further described above in connection with FIG. 5.

The error user interface 1000a may be displayed by the data-ingestion service 102 as part of validating data, a process described above in connection with FIGS. 3 and 5. For example, the data-ingestion service 102 may validate a format of a data entry and a content of a data entry. As described above, the data-ingestion service 102, in response to detecting a content or format error, may display a user interface for correcting the error. For example, as illustrated, the user interface 1000a indicates that the data location 1004a (e.g., in the $122^{nd}$ row and in a "Price" field) has an entry that is "Nine Dollars." The data-ingestion service 102 may determine that, for the field "Price," the expected format is one or more numbers, not text. Thus, the data-ingestion service may indicate that the data entry 1006a has a format error. For the data location 1004b, the data-ingestion service 102 may determine that the ZIP Code "56770" does not actually exist (e.g., by using, in some examples, a third-party service). Therefore, the data-ingestion service 102 may indicate that the data entry 1006b has a content error. For the data location 1004c, the data-ingestion service 102 may determine that, for the field "Tobacco," the expected format is "True" or "False," a format that the data entry 1006c does not have. In some embodiments, the error user interface 1000a may include more data entries than those shown.

The error user interface 1000b may be displayed in response to a user altering one or more of the data entries 1006a-c. In some embodiments, the data entries 1006a-c may be displayed in selectable or manipulatable fields. For example, a user may select a data entry to edit the text in the data entry (e.g., selecting the data entry 1006a to change "Nine Dollars" to "9", selecting the data entry 1006b to change "56770" to "56720", and selecting the data entry 1006c to change "Cigar" to "TRUE"). In some embodiments, the data-ingestion service 102 may, in response to detecting a change to a data entry, validate the updated data entry. In some embodiments, the data-ingestion service 102 may validate one or more updated data entries in response to a user selecting the input field 1002 or in response to another user action. In some embodiments, the data-ingestion service 102 may learn from the content and format errors and, for future CSV files with similar errors, automatically correct or suggest corrections for those errors.

Figure 11:
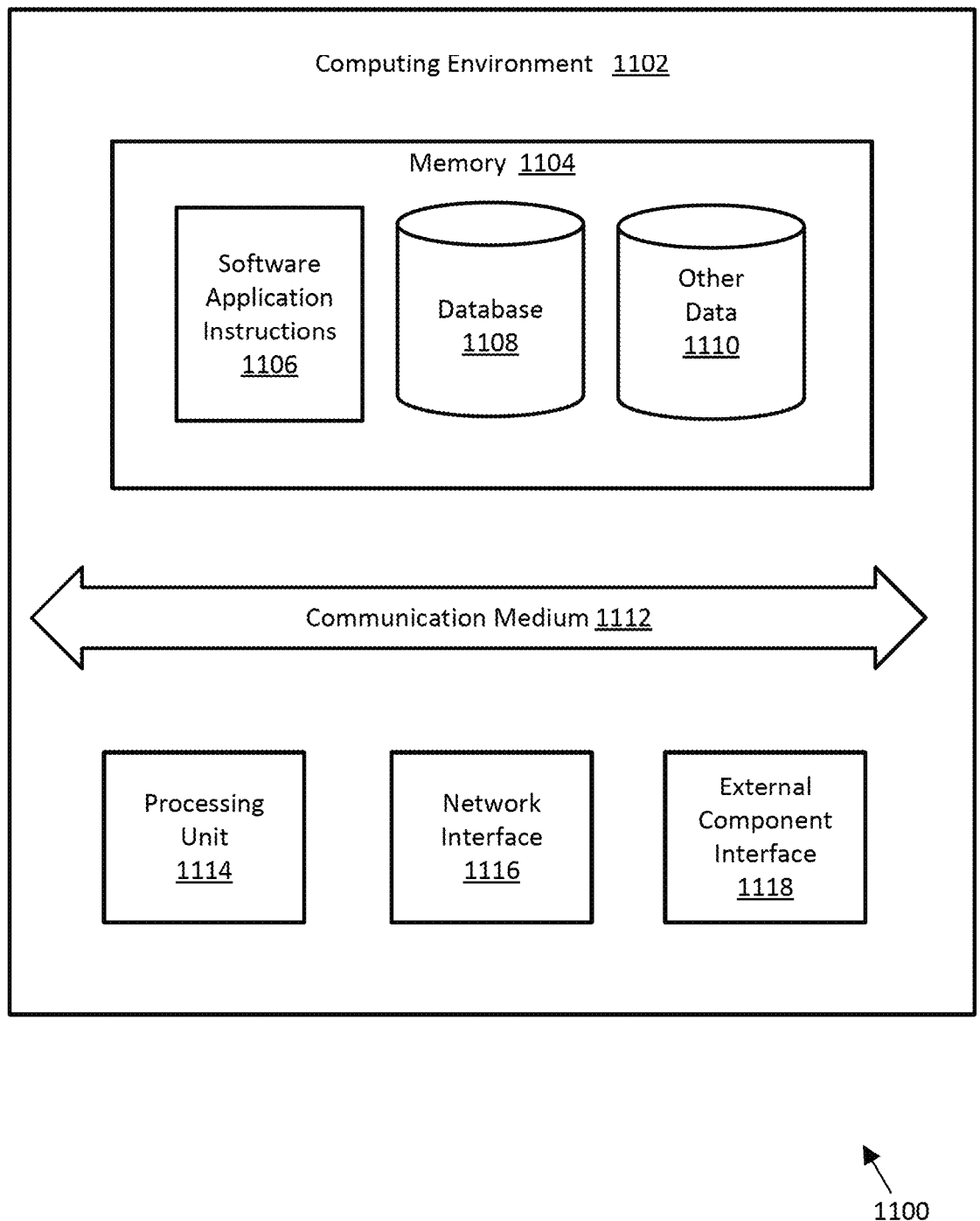
FIG. 11 illustrates an example block diagram of a computing system.

FIG. 11 illustrates an example system 1100 with which disclosed systems and methods can be used. In an example, the following can be implemented in one or more systems 1100 or in one or more systems having one or more components of system 1100; the data-ingestion service 102, one or more of the entities 104a-x, the downstream service 112, the downstream database 114, the third-party system 118, the orchestrator 202, the schema manager 204, the mapping library 208, the validation tool 214, the user interface generator 220, the log manager 222, and other aspects of the present disclosure.

In an example, the system 1100 can include a computing environment 1102. The computing environment 1102 can be a physical computing environment, a virtualized computing environment, or a combination thereof. The computing environment 1102 can include memory 1104, a communication medium 1112, one or more processing units 1114, a network interface 1116, and an external component interface 1118.

The memory 1104 can include a computer readable storage medium. The computer storage medium can be a device or article of manufacture that stores data and/or computer-executable instructions. The memory 1104 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1104 can store various types of data and software. For example, as illustrated, the memory 1104 includes software application instructions 1106, one or more databases 1108, as well as other data 1110. The communication medium 1112 can facilitate communication among the components of the computing environment 1102. In an example, the communication medium 1112 can facilitate communication among the memory 1104, the one or more processing units 1114, the network interface 1116, and the external component interface 1118. The communications medium 1112 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1114 can include physical or virtual units that selectively execute software instructions, such as the software application instructions 1106. In an example, the one or more processing units 1114 can be physical products comprising one or more integrated circuits. The one or more processing units 1114 can be implemented as one or more processing cores. In another example, one or more processing units 1114 are implemented as one or more separate microprocessors. In yet another example embodiment, the one or more processing units 1114 can include an application-specific integrated circuit (ASIC) that provides specific functionality. In yet another example, the one or more processing units 1114 provide specific functionality by using an ASIC and by executing computer-executable instructions.

The network interface 1116 enables the computing environment 1102 to send and receive data from a communication network. The network interface 1116 can be implemented as an Ethernet interface, a token-ring network interface, a fiber optic network interface, a wireless network interface (e.g., Wi-Fi), a Bluetooth interface, or another type of network interface.

The external component interface 1118 enables the computing environment 1102 to communicate with external devices. For example, the external component interface 1118 can be a USB interface, Thunderbolt interface, a Lightning interface, a serial port interface, a parallel port interface, a PS/2 interface, or another type of interface that enables the computing environment 1102 to communicate with external devices. In various embodiments, the external component interface 1118 enables the computing environment 1102 to communicate with various external components, such as external storage devices, input devices, speakers, modems, media player docks, other computing devices, scanners, digital cameras, and fingerprint readers.

Although illustrated as being components of a single computing environment 1102, the components of the computing environment 1102 can be spread across multiple computing environments 1102. For example, one or more of instructions or data stored on the memory 1104 may be stored partially or entirely in a separate computing environment 1102 that is accessed over a network. Depending on the size and scale of the computing environment 1102, it may be advantageous to include one or more load balancers to balance traffic across multiple physical or virtual machine nodes. Each node may be configured to be capable of running the full system 1100, such that portal can run and schedule jobs and serve the portal user interface as long as a single node remains functional. The environment 1102 may include monitoring technology to determine when a node is not functioning so an appropriate action can be taken.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for ingesting data, the method comprising:
receiving, by a processor, a first CSV file, the first CSV file including a plurality of incoming fields;
translating, by the processor, the first CSV file to an internal schema, wherein translating the first CSV file to the internal schema comprises applying a mapping library to map one or more of the plurality of incoming fields to one or more of a plurality of internal fields of the internal schema;
displaying, by the processor, a user interface;
via the user interface, receiving, by the processor, an input corresponding to a mapping of an unmapped field of the plurality of incoming fields to a selected field of the plurality of internal fields;
determining, by the processor, a content of the incoming data of the first CSV file, wherein the content is a location or an identification;
validating, by the processor, the content using a third-party service;
in response to failing to validate the content, displaying, by the processor, an error user interface;
by the processor, receiving, via the error user interface, an updated data entry;
updating, by the processor, the mapping library to include the mapping of the unmapped field to the selected field of the plurality of internal fields, the mapping causing the unmapped field in subsequent received CSV files to be automatically mapped to the selected field;
receiving, by the processor, a second CSV file, the second CSV file including a second plurality of incoming fields, the second plurality of incoming fields including the unmapped field; and
translating, by the processor, the second CSV file to the internal schema, wherein translating the second CSV file to the internal schema comprises automatically applying the updated mapping library and the mapping of the unmapped field to the selected field.

2. The method of claim 1,
wherein the first CSV file is sent by a first retailer; and
wherein the second CSV file is sent by a second retailer.

3. The method of claim 1,
wherein the first CSV file and the second CSV file are sent by a same entity;

wherein mapping the one or more of the plurality of incoming fields to the one or more of the plurality of internal fields comprises applying an entity-specific mapping library;

wherein the method further comprises adding the mapping of the unmapped field to the selected field to the entity-specific mapping library; and wherein translating the second CSV file to the internal schema comprises applying the entity-specific mapping library.

4. The method of claim 1, further comprising validating, by the processor, a data format of the incoming data, wherein validating the data format of the incoming data comprises:

determining, by the processor, a format of a data entry of the incoming data;

comparing, by the processor, the format of the data entry to an expected format of a field of the plurality of internal fields;

in response to determining that the format of the data entry does not match the expected format, displaying, by the processor, the error user interface; and by the processor, receiving, via the error user interface, second updated data entry.

5. The method of claim 1, wherein translating, by the processor, the first CSV file to the internal schema further comprises one or more of:

separating, by the processor, a combined incoming field of the plurality of incoming fields to two or more separate internal fields of the plurality of internal fields; or combining, by the processor, two or more separate incoming fields of the plurality of incoming fields into one combined internal field of the plurality of internal fields.

6. The method of claim 1, wherein the internal schema is one of a plurality of internal schemas; and wherein the method further comprises selecting, by the processor, the internal schema from the plurality of internal schemas based on a category of the incoming data.

7. The method of claim 1, wherein incoming data of the first CSV file and second incoming data of the second CSV file relate to one or more of retail store data or product data.

8. The method of claim 1, further comprising transmitting, by the processor, an ingested CSV file to a downstream service;

wherein fields of the ingested CSV file correspond to the plurality of internal fields; and wherein data of the ingested CSV file correspond to incoming data of the first CSV file.

9. The method of claim 1, wherein translating, by the processor, the first CSV file to the internal schema comprises generating, by the processor, data based at least in part on incoming data of the first CSV file.

10. The method of claim 1, wherein translating, by the processor, the first CSV file to the internal schema comprises:

attempting to map the unmapped field to the plurality of internal fields;

failing to map the unmapped field to the plurality of internal fields; and wherein displaying, by the processor, the user interface comprises displaying, by the processor, the user interface in response to failing to map the unmapped field to the plurality of internal fields, the user interface comprising the unmapped field and an input field to select the selected field from the plurality of internal fields.

11. The method of claim 1, wherein the user interface comprises:

text related to the unmapped field; and a drop-down list of at least some of the plurality of internal fields;

wherein the input comprises a selection in the drop-down list.

12. The method of claim 1, further comprising:

displaying, by the processor, a receiving user interface for receiving the first and second CSV files;

wherein receiving the first and second CSV files is performed by receiving the first and second CSV files via the receiving user interface;

wherein the receiving user interface includes a template, the template including the plurality of internal fields;

wherein the receiving user interface comprises a view-template input field; and wherein, in response to a selection of the view-template input field, the receiving user interface provides one or more of a display of the template or a download of the template.

13. A system for ingesting data, the system comprising:

a mapping library;

an internal schema;

a processor;

and a memory storing instructions, wherein the instructions, when executed by the processor, cause the data-ingestion system to:

receive a first CSV file, the first CSV file including a plurality of incoming fields;

translate the first CSV file to the internal schema, wherein translating the first CSV file to the internal schema comprises mapping, using the mapping library, one or more of the plurality of incoming fields to one or more of a plurality of internal fields of the internal schema;

receive an input corresponding to a mapping of an unmapped field of the plurality of incoming fields to a selected field of the plurality of internal fields;

attempt to validate a content of incoming data of the first CSV file by sending a request to a third-party service, wherein the content is a location, an email, or an identification;

in response to failing to validate the content, display an error via a user interface;

receive, via the user interface, an updated data entry;

update the mapping library to include the mapping of the unmapped field of the plurality of incoming fields to the selected field of the plurality of internal fields, the mapping causing the unmapped field in subsequent received CSV files to be automatically mapped to the selected field;

receive a second CSV file, the second CSV file including a second plurality of incoming fields, the second plurality of incoming fields including the unmapped field; and translate the second CSV file to the internal schema, wherein translating the second CSV file to the internal schema comprises applying, using the updated mapping library, the mapping of the unmapped field to the selected field.

14. The system of claim 13, wherein the instructions, when executed by the processor, further cause the data-ingestion system to:

in response to failing to map the unmapped field to any of the plurality of internal fields, display the user interface; and receive, via the user interface, the mapping of the unmapped field of the plurality of incoming fields to the selected field of the plurality of internal fields.

15. A data cleansing method, the method comprising:

receiving, by a processor, a first CSV file, the first CSV file including a plurality of incoming fields;

translating, by the processor, the first CSV file to an internal schema, wherein translating the first CSV file to the internal schema comprises applying a mapping library to map one or more of the plurality of incoming fields to one or more of a plurality of internal fields of the internal schema;

displaying, by the processor, a user interface;

via the user interface, receiving, by the processor, an input corresponding to a mapping of an unmapped field of the plurality of incoming fields to a selected field of the plurality of internal fields;

updating, by the processor, the mapping library to include the mapping of the unmapped field to the selected field of the plurality of internal fields, the mapping causing the unmapped field in subsequent received CSV files to be automatically mapped to the selected field;

attempting to validate, by the processor, a content of incoming data of the first CSV file by invoking a third-party service, wherein the content is a location, an email, or an identification;

in response to failing to validate the content, displaying, by the processor, an error via the user interface;

by the processor, receiving, via the user interface, an updated data entry;

receiving, by the processor, a second CSV file, the second CSV file including a second plurality of incoming fields, the second plurality of incoming fields including the unmapped field; and translating, by the processor, the second CSV file to the internal schema, wherein translating the second CSV file to the internal schema comprises applying the updated mapping library and the mapping of the unmapped field to the selected field.

16. The method of claim 15, wherein the first CSV file is sent by a first location of a retailer; and wherein the second CSV file is sent by a second location of the retailer.

* * * * *